United States Patent
Lane et al.

(10) Patent No.: US 10,115,240 B2
(45) Date of Patent: Oct. 30, 2018

(54) VIRTUAL AREA GENERATION AND MANIPULATION

(71) Applicant: Amazon Technologies, Inc., Seattle, WA (US)

(72) Inventors: Scot Michael Lane, Carlsbad, CA (US); Francis Xavier Surjo-Subagio, Irvine, CA (US); David Edward Maldonado, Mission Viejo, CA (US); Carl Lavoie, Newport Beach, CA (US); Brian David Fisher, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/823,230

(22) Filed: Aug. 11, 2015

(65) Prior Publication Data
US 2017/0046882 A1 Feb. 16, 2017

(51) Int. Cl.
| | |
|---|---|
| G06T 19/20 | (2011.01) |
| G06T 15/00 | (2011.01) |
| A63F 13/52 | (2014.01) |
| A63F 13/355 | (2014.01) |
| A63F 13/352 | (2014.01) |

(Continued)

(52) U.S. Cl.
CPC ............ *G06T 19/20* (2013.01); *A63F 13/23* (2014.09); *A63F 13/352* (2014.09);
(Continued)

(58) Field of Classification Search
None
See application file for complete search history.

(56) References Cited

U.S. PATENT DOCUMENTS

| 6,415,317 B1 | 7/2002 | Yelon et al. |
| 2002/0069261 A1* | 6/2002 | Bellare ............... G06F 17/3089 709/218 |

(Continued)

FOREIGN PATENT DOCUMENTS

WO   WO 2002/062436 A2   8/2002

OTHER PUBLICATIONS

Rice; "Secure Map Generation for Multiplayer, Turn-Based Strategy Games"; University of Denver; Electronic Theses and Dissertions; Jan. 2014; 44 pages.

(Continued)

*Primary Examiner* — Said Broome
(74) *Attorney, Agent, or Firm* — Baker & Hostetler LLP

(57) ABSTRACT

Techniques for virtual area generation and manipulation are described herein. The described techniques may be used, for example, for virtual areas in electronically presented content items, such as video games and other media items. In some examples, one or more interfaces may be provided that allow content developers to provide and specify a set of rules associated with the virtual area. The set of rules may include, for example, terrain rules, object rules, and other rules associated with other aspects of the virtual area. The terrain rules may include rules for generating, distributing, and/or manipulating different types of terrain, such as such as flat and/or buildable space, mountains, valleys, berms, rivers, lakes, oceans, deserts, forests, and many others. The object rules may include rules for generating, distributing, and/or manipulating different types of objects, such as trees, bushes, rocks, snow, grass, fish, birds, animals, people, vehicles, buildings, and others.

14 Claims, 8 Drawing Sheets

(51) Int. Cl.
*A63F 13/57* (2014.01)
*A63F 13/23* (2014.01)
*G06F 3/048* (2013.01)
*G06T 19/00* (2011.01)
*G06T 17/05* (2011.01)

(52) U.S. Cl.
CPC ............ *A63F 13/355* (2014.09); *A63F 13/52* (2014.09); *A63F 13/57* (2014.09); *G06F 3/048* (2013.01); *G06T 15/00* (2013.01); *G06T 17/05* (2013.01); *G06T 19/003* (2013.01); *A63F 2300/531* (2013.01); *G06T 2200/04* (2013.01); *G06T 2210/64* (2013.01); *G06T 2215/16* (2013.01)

(56) References Cited

U.S. PATENT DOCUMENTS

2005/0264567 A1   12/2005  Sommers

2012/0215505 A1*  8/2012  Srivastav ............ G08G 5/0017
                                                             703/6

OTHER PUBLICATIONS

Noghani et al.; "Randomly Generated 3D Environments for Serious Games"; Second Int'l Conf. on Games and Virtual Worlds for Serious Applications; 2010; p. 3-10.

Schneider et al.; "Real-Time Editing, Synthesis, and Rendering of Infinite Landscapes on GPUs"; Vision, Modeling and Visualization; 2006; 9 pages.

International Patent Application No. PCT/US2016/046137; Int'l Search Report and the Written Opinion; dated Nov. 23, 2016; 13 pages.

International Patent Application No. PCT/US2016/046137; Int'l Preliminary Report on Patentability; dated Feb. 22, 2018; 8 pages.

Bruneton et al.; "Real-time rendering and editing of vector-based terrains"; Eurographics; vol. 27 Issue 2; Apr. 2008; pp. 311-320.

Singapore Patent Application No. 11201801107Y; Written Opinion and Search Report; dated Jul. 11, 2018; 8 pages.

* cited by examiner

VIRTUAL AREA GENERATION AND MANIPULATION

BACKGROUND

Electronically presented content items, such as video games and other media items, may often present a virtual area, which may also sometimes be referred to as a virtual world, in which various actions may be performed. In some examples, a content item may improve the user experience by making its virtual area appear to be more realistic and/or life-like, such as by increasing the complexity and level of detail of the virtual area. Unfortunately, however, increasing the complexity of a virtual area may substantially increase the time, effort, and resources required to create, present, maintain and modify the virtual area. In some examples, a virtual area may be made more interesting to users by including various different types of terrain, such as flat and/or buildable space, mountains, valleys, berms (e.g., cliffs), rivers, lakes, oceans, deserts, forests, and many others. The terrain may be populated by various objects, such as trees, bushes, rocks, snow, grass, fish, birds, animals, people, vehicles, buildings, and many others.

Some conventional content development techniques may require certain types of terrain and/or objects to be manually positioned and inserted into a virtual area, which, particularly for larger and more detailed areas, may be a highly time consuming process. Moreover, modifications to areas of terrain and/or populated objects in an executing content item may sometimes require the content item to be stopped and restarted, thereby interrupting and degrading the user experience. Another way in which some virtual areas may appear life-like is by including different times of day (e.g., morning, daytime, night), different seasons (e.g., summer and winter), and different weather conditions (e.g., sun, rain and snow). However, the transitions between these seasons and weather conditions may often appear unnatural to users. For example, an area may transition directly from the middle of winter to the middle of summer. This may result in unexpected behaviors, such as trees changing directly from having no leaves to having fully grown leaves.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
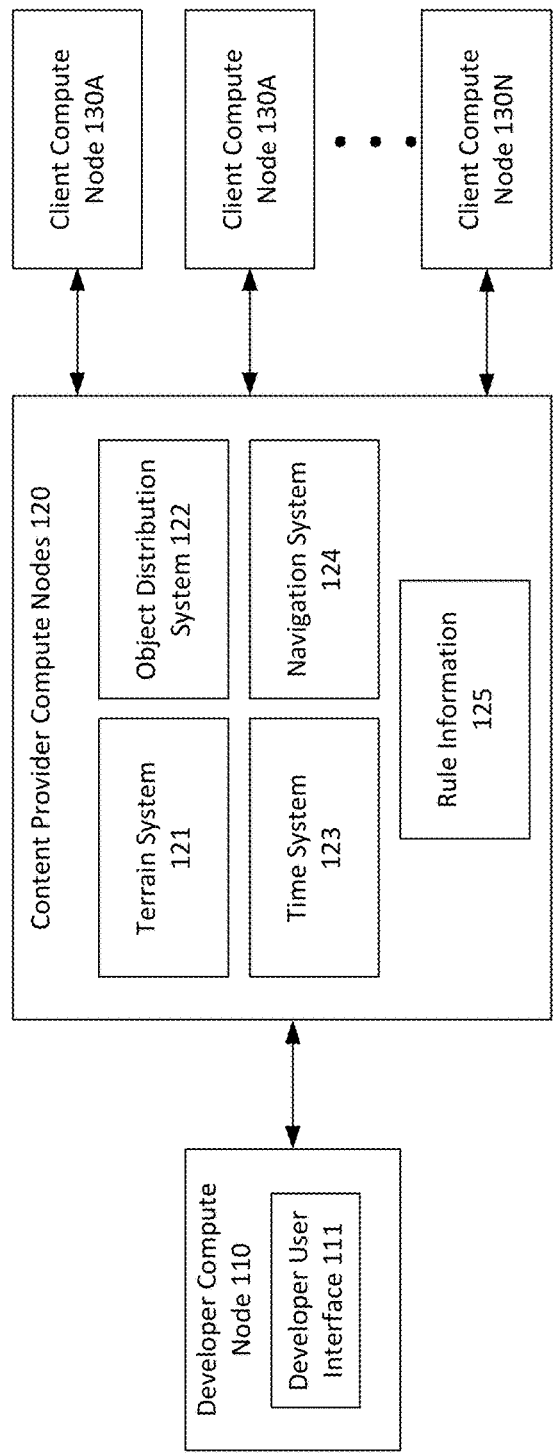
FIG. 1 is a diagram illustrating an example system for generating and manipulating a virtual area that may be used in accordance with the present disclosure.

Techniques for virtual area generation and manipulation are described herein. The described techniques may be used, for example, for virtual areas in electronically presented content items, such as video games and other media items. In some examples, one or more interfaces may be provided that allow content developers to provide and specify a set of rules associated with the virtual area. The set of rules may include, for example, terrain rules, object rules, and other rules associated with other aspects of the virtual area. The terrain rules may include rules for generating, distributing, and/or manipulating different types of terrain, such as such as flat and/or buildable space, mountains, valleys, berms (e.g., cliffs), rivers, lakes, oceans, deserts, forests, and many others. The terrain rules may indicate, for example, an amount or distribution of one or more terrain types, a terrain appearance, a berm sharpness, a mountain height, a valley intensity, terrain characteristics associated with one or more times, seasons, or weather conditions, and terrain characteristics in relation to one or more boundaries or positions. The object rules may include rules for generating, distributing, and/or manipulating different types of objects, such as trees, bushes, rocks, snow, grass, fish, birds, animals, people, vehicles, buildings, and many others. The object rules may indicate, for example, a density or distance between one or more objects, an object appearance, an object behavior, an amount or distribution of one or more object types, object characteristics associated with one or more times, seasons, or weather conditions, object characteristics in relation to one or more types of terrain, object characteristics in relation to one or more other objects, or object characteristics in relation to one or more boundaries or positions.

The terrain rules may, for example, be applied to generate terrain data associated with the virtual area. The object rules may then be applied to generate first object data associated with the virtual area. In some cases, the object rules may be applied to the virtual area based, at least in part, on the terrain data. For example, certain objects may have higher or lower density levels or, in some cases, may be restricted from distribution at or near certain types of terrain. In particular, in some cases, trees may be restricted from distribution in lakes and rivers, and, even on land, trees may sometimes have varying density levels on different types of terrain (e.g., flat space, berms, mountains, etc.). The object rules may also be applied based on information associated with at least one of time, season, weather, object navigation, or user input. The first object data may then be provided for performing a first rendering of at least part of the virtual area in association with the first object data and the terrain data. The object rules may then be re-applied to the virtual area to generate second object data associated with the virtual area. The re-applying of the object rules may also be based, at least in part, on the terrain data and on changes in information associated with at least one of time, season, weather, object navigation, or user input. The second object data may then be provided for performing a second rendering of at least part of the virtual area in association with the second object data and the terrain data.

In some examples, such as the case of multi-player video games, the virtual area may correspond to a content item whose execution is distributed between one or more servers and one or more clients. In these examples, the terrain rules may sometimes be sent from the servers to the clients such that the terrain rules may be applied separately by both the servers and the clients. Providing the terrain rules to the clients may be advantageous by, for example, allowing the clients to generate terrain data and, therefore, eliminating the need for servers to transmit the terrain data to the clients. This may sometimes conserve bandwidth, reduce data transmission costs, and reduce delays associated with presentation of the content item at the clients. In some examples, in addition to the clients, the servers may also separately apply the terrain rules in order to generate terrain data for use at the servers. For example, the servers may use the terrain data to subsequently apply object rules and generate object data based, at least in part, on the terrain rules. Generating the object data at the servers may be advantageous because, for example, the servers may receive state updates from multiple connected clients and may use the state updates during application of the object rules. For example, when different players chop down trees, throw rocks, hunt animals, or remove fish from a lake, the servers may use this information to apply and re-apply various object rules.

One or more rules may, for example, be repeatedly applied throughout execution of a content item. For example, rules may be repeatedly applied at various specified intervals and/or in response to various events or occurrences. The repeated application of rules may provide a number of advantages. For example, in some cases, one or more rules may be generated and/or modified during execution of a content item. In particular, a developer may wish to change a density or distance between one or more objects or change the boundaries of an area in which objects may be distributed. In some examples, repeated application of rules during content item execution may allow incorporation of new or adjusted rules into the content item without the need to stop and restart execution of the content item. Also, in some examples, the system may maintain various time measurements, such as a time of day and a time of year, which may enable smooth transitions between various seasons, stages of a day, and other stages of time.

In some examples, the virtual area may be divided into a set of sub-areas, such as a grid or another collection of sub-areas. Each sub-area may have one or more associated components that may that apply one or more rules within their respective sub-area. In addition to applying the rules, the associated components may also report information associated with the set of rules to other components and/or receive such information from other components. For example, a component may report when objects within its respective sub-area are generated, deleted, change state, or navigate to or from another sub-area. The information may, for example, be used by components associated with other sub-areas to apply the rules within their associated sub-areas. The information may also, for example, be provided as telemetry information to developers to allow the developers to make decisions about a content item, such as generating or adjusting of rules. In some examples, a developer user interface may allow developers to view updated telemetry information for an executing content item at both global and various local levels (e.g., one or more sub-areas, lakes, mountains, villages, etc.).

Some example systems for implementing the described techniques will now be described in detail. In particular, FIG. 1 is a diagram illustrating an example system for generating and manipulating a virtual area that may be used in accordance with the present disclosure. As shown, FIG. 1 includes a developer compute node 110, content provider compute nodes 120, and client compute nodes 130A-N (referred to collectively hereinafter as client compute nodes 130). Compute nodes 110, 120 and 130 may communicate using one or more communications networks, for example one or more local area networks (LAN's) and/or one or more wide area networks (WAN's) such as the Internet.

Figure 5:
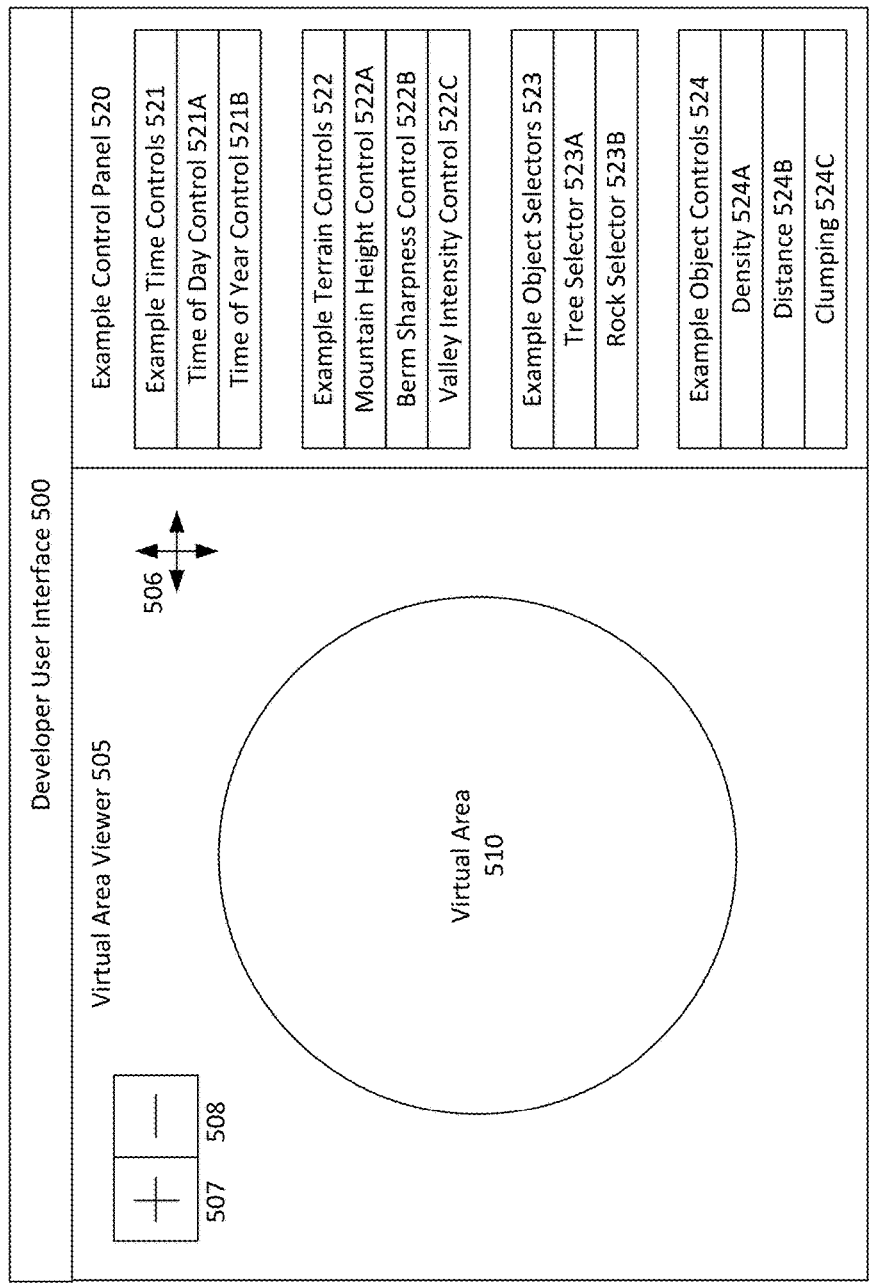
FIG. 5 is a diagram illustrating an example developer user interface that may be used in accordance with the present disclosure.

Developer compute node 110 includes a developer user interface 111 that generally allows a content item developer to provide and receive information relating to a virtual area of a content item. In some cases, developer user interface 111 may allow a developer to provide and adjust a set of rules associated with a virtual area. As set forth above, the set of rules may include, for example, terrain rules, object rules, and other rules associated with other aspects of the virtual area. The terrain rules may include rules for generating, distributing, and/or manipulating different types of terrain, such as such as flat and/or buildable space, mountains, valleys, berms (e.g., cliffs), rivers, lakes, oceans, deserts, forests, and many others. The terrain rules may indicate, for example, an amount or distribution of one or more terrain types, a terrain appearance, a berm sharpness, a mountain height, a valley intensity, terrain characteristics associated with one or more times, seasons, or weather conditions, and terrain characteristics in relation to one or more boundaries or positions. The object rules may include rules for generating, distributing, and/or manipulating different types of objects, such as trees, bushes, rocks, snow, grass, fish, birds, animals, people, vehicles, buildings, and many others. The object rules may indicate, for example, a density or distance between one or more objects, an object appearance, an object behavior, an amount or distribution of one or more object types, object characteristics associated with one or more times, seasons, or weather conditions, object characteristics in relation to one or more types of terrain, object characteristics in relation to one or more other objects, or object characteristics in relation to one or more boundaries or positions. The developer user interface 111 may include various different input mechanisms that allow the rules to be provided and adjusted, and some examples of these input mechanisms are described in detail below with reference to an example developer user interface that is depicted in FIG. 5.

In combination with providing and adjusting of rules, the developer user interface 111 may also allow developers to view telemetry information associated with a virtual area. The telemetry information may be presented at any point before, during, or after execution of the content item and may correspond to any prior, current, or future time of timeframe. The telemetry information may include, for example, information associated with terrain, objects, players, time, seasons, weather, and other features of a virtual area. In some examples, the telemetry information may include a graphical view of the virtual area or any portion of the virtual area, such as would be seen from a virtual camera positioned within the virtual area. Various navigation controls may allow the developer to navigate to different portions of the virtual area. The presented telemetry information may include, for example, details associated with any virtual area rules, such as player, object and/or terrain amounts, densities, distances, clumping, characteristics, locations, boundaries, berm sharpness, mountain height, valley intensity, and many others. The telemetry information may be aggregated throughout any global or local portion of the virtual area and, in some cases, may correspond to a portion of the virtual area that is graphically depicted in the user interface. The telemetry information may be used by the developers, for example, for the purposes of providing and/or adjusting rules before, during, or after execution of the content item.

Rules and other information associated with a virtual area may be provided by developer compute node 110 and received by content provider compute node 120, which may store the received rules and associated information as rule information 125. Generally, content provider compute node 120 may, for example, include one or more servers and may execute, for example in combination with clients 130, an electronically presented content item, such as a video game, a massive multi-player online (MMO) video game, or other media item. In the example of FIG. 1, content provider 120 includes four systems 121-124 that enable efficient generation and manipulation of a virtual area for use in an executing content item. Content provider 120 may also include any number of fewer or additional systems or components for these and other purposes.

In particular, terrain system 121 generally enables generation, modification, and serving of terrain data for use in association with the virtual area. As set forth above, the terrain data may be generated and modified by, for example, applying one or more terrain rules to the virtual area. In some examples, terrain data may include an indication of which types of terrain (e.g., flat space, mountain, valleys, berms, rivers, lakes, oceans, etc.) occupy which areas of space, the characteristics of certain types or portions of terrain (e.g., height, sharpness, intensity, color, texture, weather-related characteristics, seasonal characteristics, time of day characteristics), and other information associated with terrain of a virtual area.

Object distribution system 122 generally maintains object populations, reacts to changes in environment, and enables generation, modification, and serving of object data for use in association with the virtual area. As set forth above, the object data may be generated and modified by, for example, applying one or more object rules to the virtual area. In some cases, the object rules may be applied to the virtual area based, at least in part, on terrain data. In particular, certain objects may have higher or lower density levels or, in some cases, may be restricted from distribution at or near certain types of terrain. As set forth above, in some cases, trees may be restricted from distribution in lakes and rivers, and, even on land, trees may sometimes have varying density levels on different types of terrain (e.g., flat space, berms, mountains, etc.). In some examples, object data may include an indication of which objects occupy which positions (e.g., using coordinate or other location values), the speed and direction of movement of objects, other object characteristics (e.g., color, texture, size, shape, rotation). In some examples, object data may include indications of seasonal characteristics, such as the leaves on a tree, whose size, shape, and quantity may differ in different seasons. Object data may also include weather-related characteristics, time of day characteristics, and other characteristics for various objects. Object data may also include information about when objects are added, removed, change location, or are otherwise modified.

Time system 123 generally maintains and serves information about various times, seasons, and weather conditions associated with a virtual area. As set forth above, terrain and objects may sometimes have varying appearances and other characteristics depending on time of day, time of year (e.g., season), and different weather conditions. In some examples, the time system 123 may maintain a time of day and/or a time of year in association with a virtual area. One or more rules associated with the virtual area may be applied based, at least in part, on the time of day and/or the time of year. The time of day and/or time of year may be maintained at any desired level of granularity (e.g., measured to particular seconds, hours, days, weeks, months, seasons, or other time gradations). In some examples, the time of year may provide a finer granularity than a mere indication of a particular season. For example, the time of year may indicate a particular date, month, or, in some cases, an offset value from a particular peak or center point of a season. Additionally, object and terrain rules may also indicate different appearances and other characteristics for different dates, months, or seasonal offsets. This may enable an appearance of a smooth transition between seasons. Additionally, in some examples, time system 123 may, alone or in combination with navigation system 1243, be responsible for generating moving weather systems, such as rain, snow, and cloud systems. Time system 123 and/or navigation system 124 may generate such systems at particular locations and set the systems in motion with various directions with various speeds. Time system 123 and/or navigation system 124 may also adjust the size, intensity, speed, direction, and other characteristics of moving weather systems.

Navigation system 124 is generally responsible for navigating various objects that may travel throughout the virtual area, such as projectiles, people, animals, fish, birds, vehicles, and weather systems. Navigation system 124 may, for example, perform operations to avoid collisions when desirable and to handle collisions between objects when desirable. As set forth above, information associated with movement of objects may sometimes be provided for use by object distribution system 122.

In some examples, terrain data and/or object data generated by content provider 120 may be transmitted to clients 130. Also, in some examples, clients 130 may use the terrain data and/or object data to render a graphical depiction of the virtual area or any portions thereof. Thus, in some examples, clients 130 may include one or more graphics processing units (GPU's) for rendering of graphics associated with a virtual area. In some examples, it may not be necessary for content provider 120 to send terrain data to clients 130. Rather, the content provider may send terrain rules to clients 130, and the clients 130 may generate their own terrain data based on the terrain rules.

In some examples, rendering of a virtual area may sometimes be distributed between content provider 120 and clients 130. Thus, in such examples, both clients 130 and content provider 120 may include one or more GPU's. In yet other examples, a content item may be rendered entirely by content provider 120, and the rendered graphics may be transmitted over one or more networks from content provider 120 to clients 130.

Clients 130 may generally receive user inputs and transmit information associated with the user inputs to content provider 120. Such user inputs may include, for example, player movements and actions (e.g., firing a weapon, chopping down a tree, running to a new location). This client input information may, for example, be used by object distribution system 122 to update and modify object data. For example, if a player chops down a tree or catches a fish, object distribution system 122 may determine to add a new tree, fish, or other object, possibly at a different location and with different characteristics.

As set forth above, content provider 120 may include various systems, such as systems 121-124, for generating and manipulating a virtual area. In some examples, a virtual area may represent large space with complex terrain and object distributions. In these and other cases, it may sometimes be desirable to divide the virtual area into multiple sub-areas and to assign one or more components to handle various operations associated with each of the sub-areas. In some examples, the components may perform operations concurrently or partially concurrently with components assigned to other sub-areas. This may improve efficiency by, for example, allowing various operations associated with the virtual area to be distributed and performed in parallel or partially in parallel with one another. In some examples, the components associated with each sub-area may include one or more actors that may concurrently receive and respond to messages and also send messages to other actors. In some examples, the components that apply one or more of the plurality of rules within their associated sub-area and may report information associated with application of the one or more of the plurality of rules within their associated sub-area.

Figure 2:
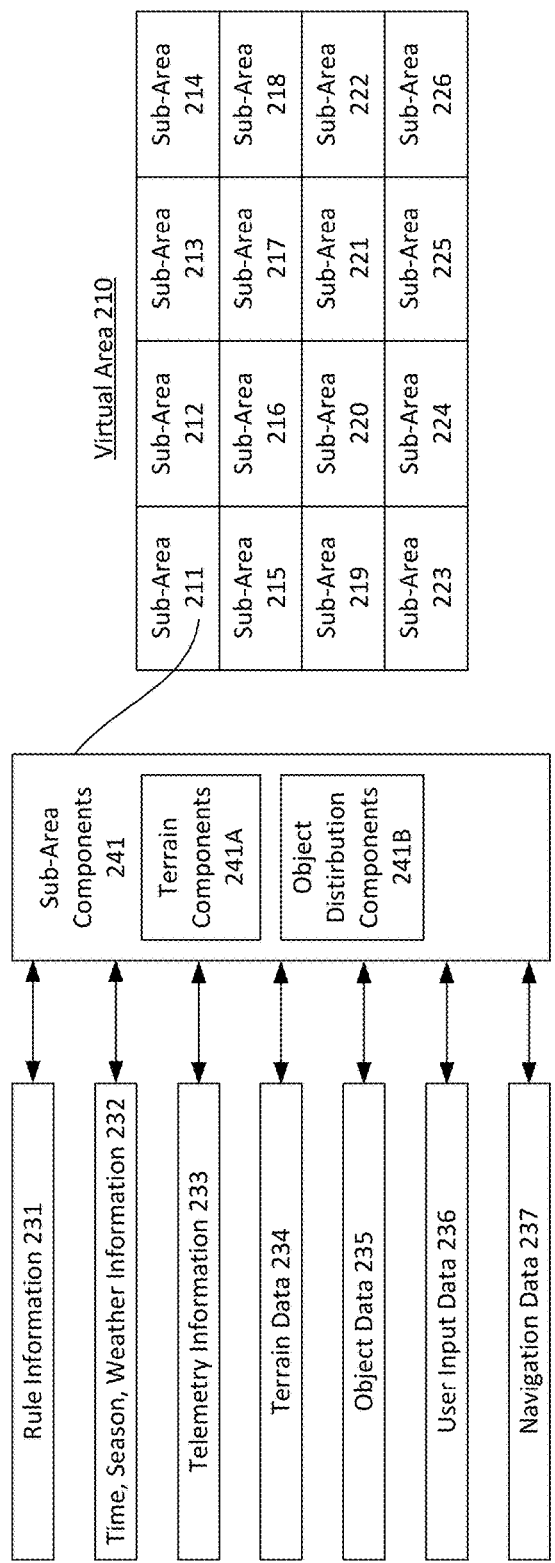
FIG. 2 is a diagram illustrating example sub-areas and associated components that may be used in accordance with the present disclosure.

FIG. 2 is a diagram illustrating example sub-areas and associated components that may be used in accordance with the present disclosure. As shown in FIG. 2, an example virtual area 210 is divided into sixteen sub-areas 211-216. As should be appreciated, the virtual area 210 and sixteen sub-areas 211-216 shown in FIG. 2 are merely non-limiting examples. A virtual area and/or sub-areas need not necessary consist of square or rectangular shaped areas and may be defined using any desired size or shape. Additionally, there is no requirement that sub-areas must be of equal size with one another.

FIG. 2 shows sub-area components 241 that are assigned to respective sub-area 211. As should be appreciated, although not shown in FIG. 2, other sub-areas may include other assigned components associated with those respective sub-areas. As shown, sub-area components 241 include terrain components 241A for performing terrain-related operations and object distribution components 241B for performing object distribution-related operations. Components 241 may also include any number of additional components. It is noted that, although terrain components 241A and object distribution components 241B are both associated with sub-area 211, there is no requirement that terrain evaluation and object distribution evaluation must be performed using identical sub-areas. In some examples, a virtual area may be divided into different sub-areas (or may not be divided at all) for purposes, of terrain operations, object distribution operations, or other operations.

In the example of FIG. 2, sub-area components 241 receive and/or provide rule information 231, time, season, and weather information 232, telemetry information 233, terrain data 234, object data 235, user input data 236, and navigation data 237. The rule information 231 may indicate various rules that are, for example, globally applicable to the virtual area 210 and/or locally applicable to sub-area 211, such as applicable to a lake or other type of space that is wholly or partially included in or adjacent to sub-area 211. Examples of such rules are described in detail above and are not repeated here. The rule information 231 may also include various rule adjustments, including changes, additions, and deletions of rules. The time, season, and weather information 232 may include information such as a time of day, time of year, season, seasonal offset, and positions and intensity of moving weather systems and other information.

In some examples, the navigation information 237 may include information about objects that are moving throughout virtual area 210 and that are entering sub-area 211 from one or more other sub-areas and/or moving from sub-area 211 to one or more other sub-areas. Also, in some examples, the user input data 236 may include information about actions performed by one or more clients, such as chopping down a tree, catching a fish, and various other actions. Telemetry information 233 may include telemetry information received from various sources, such as one or more other sub-areas, from terrain system 121, object distribution system 122, time system 123, navigation system 124, clients 130, and other sources. Telemetry information 223 may further include information about any aspect of virtual area 210, such as amounts, positions, and characteristics of terrain, objects, or any other entities within virtual area 210, aggregated at various global and/or local (e.g., sub-area) levels. Telemetry information may also include time, season, and weather information (although such information is specifically indicated in FIG. 2 using a separate element 232).

Terrain components 241A may use information 231-237 to generate and update terrain data 234 for sub-area 211. As set forth above, terrain data may include an indication of which types of terrain occupy which areas of space, the characteristics of certain types or portions of terrain, and other information associated with terrain of an area or sub-area.

Object distribution components 241B may use information 231-237 as well as terrain data from terrain components 241A to generate and update object data 235 for sub-area 211. As set forth above, object data may include an indication of which objects occupy which positions, the speed and direction of movement of objects, and other object characteristics (e.g., color, texture, size, shape, seasonal characteristics). For example, consider the scenario in which a particular rule requires a constant number of fish to be maintained in a lake. Now suppose that object distribution components 241B determine that, in the time since the particular rule was last applied, two fish were eaten by a shark within sub-area 211. Object distribution components 241B may also determine that, in the time since the particular rule was last applied, a fish has swam into sub-area 211 from neighboring sub-area 212. Based on this information, object distribution components 241B may determine that there is one less fish within sub-area 211 than there was during the last time that the particular rule was applied. Accordingly, in order to comply with the particular rule, distribution components 241B may determine to spawn one new fish at a location somewhere within sub-area 211.

In addition to receiving information 231-237 as input, components 241 may also provide information 231-237 as output, such as to one or more other sub-areas, to terrain system 121, object distribution system 122, time system 123, navigation system 124, clients 130, and to other sources. For example, input components 241 may generate, update, and provide terrain data and object data to various other components such as described above. As another example, telemetry information output by components 241 may include information about objects that are moving throughout virtual area 210 and that are exiting sub-area 211 into one or more other sub-areas. Telemetry information 223 output by components 241 may further include information about any aspect of sub-area 211, such as amounts, positions, and characteristics of terrain, objects, or any other entities within sub-area 211.

Thus, as set forth above, various components, such as those associated with different sub-areas, may be used to generate and update terrain data, object data, and other data. Terrain data and object data may be used to render portions of a virtual area, such as by being provided to one or more GPU's and/or other graphics processing components. As also set forth above, in some examples, at least a portion of rendering operations associated with a virtual area may be performed at client devices. In some cases, the content provider (e.g., servers) may apply the virtual rules as described above to generate and transmit both terrain data and object data to connected clients. The clients may then receive the terrain data and object data and render the virtual area based, at least in part, on the received terrain data and object data.

In some examples, transmitting terrain data and object data from servers to clients may be advantageous because it may allow clients to render the virtual area without the need to apply the virtual area and generate the terrain data and object data at the clients. In some other examples, however, it may be desirable to reduce the amount of data that is transmitted from servers to clients, thereby, for example, reducing network bandwidth usage, transmission costs, and potential communications delays. One technique for reducing the amount of data that is transmitted from servers to clients involves transmitting the terrain rules from the servers to the clients and allowing the clients to generate terrain data at the clients using the transmitted terrain rules. In some examples, this may reduce the amount of transmitted data because terrain rules may often consist of less data than the terrain data.

Figure 3:
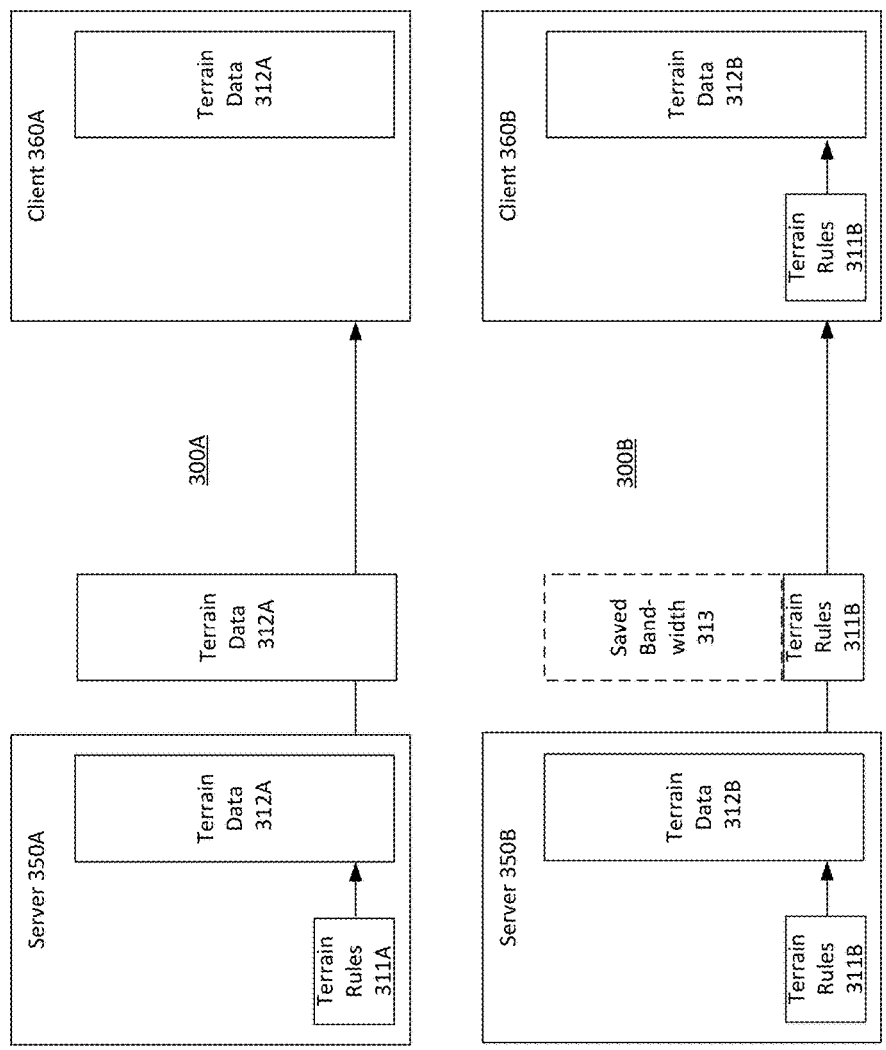
FIG. 3 is a diagram illustrating example server and client information exchanges that may be used in accordance with the present disclosure.

FIG. 3 is a diagram illustrating example server and client information exchanges that may be used in accordance with the present disclosure. As shown, the top portion of FIG. 3 depicts communications 300A in which terrain data 312A is transmitted from server 350A to client 360A. In greater detail, it is seen that server 350A applies terrain rules 311A to generate terrain data 312A. Server 350A then transmits terrain data 312A to client 360A, which may use the terrain data 312B in combination with other received data (not shown) to render the virtual area or any portion thereof.

By contrast, the bottom portion of FIG. 3 depicts communications 300B in which terrain rules 311B are transmitted from server 350B to client 360B. In greater detail, it is seen that server 350B applies terrain rules 311B to generate terrain data 312B. However, rather than generating terrain data 312B, server 350B instead transmits terrain rules 311B to client 360B. Client 360B then uses the transmitted terrain rules to generate a client version of terrain data 312B. Client 360B may then use the client version of terrain data 312B in combination with other received data (not shown) to render the virtual area or any portion thereof.

As shown in FIG. 3, the transmitted terrain rules 311B include a substantially smaller amount of data than transmitted terrain data 312A (as indicated by terrain rules 311B being shown with a smaller shape in FIG. 3 than terrain data 312A). As also shown in FIG. 3, the difference in the amount of data included in terrain rules 311B as compared to terrain data 312A is indicated by dashed-lined rectangular element 313, which corresponds to an amount of saved communications bandwidth made created by transmitting terrain rules 311B as opposed to terrain data 312A.

It is noted, in the cases of both communications 300A and communications 300B, that the servers 350 may generate terrain data. In the case of communications 300B, the terrain data is generated at server 350B even though it is not transmitted to the client, which results in the terrain rules being separately applied, and the terrain data being separately generated, by both server 350B and client 360B. In the example of FIG. 3, the servers 350 may use the terrain data to subsequently apply object rules and generate object data based, at least in part, on the terrain data. As set forth above, generating the object data at the servers may be advantageous because, for example, the servers may receive changes in various types of information (e.g., client inputs, navigation data, time, season, and weather information, etc.) and/or adjustments to rules and may use information and/or rule adjustments to apply and/or re-apply of the object rules.

Figure 4:
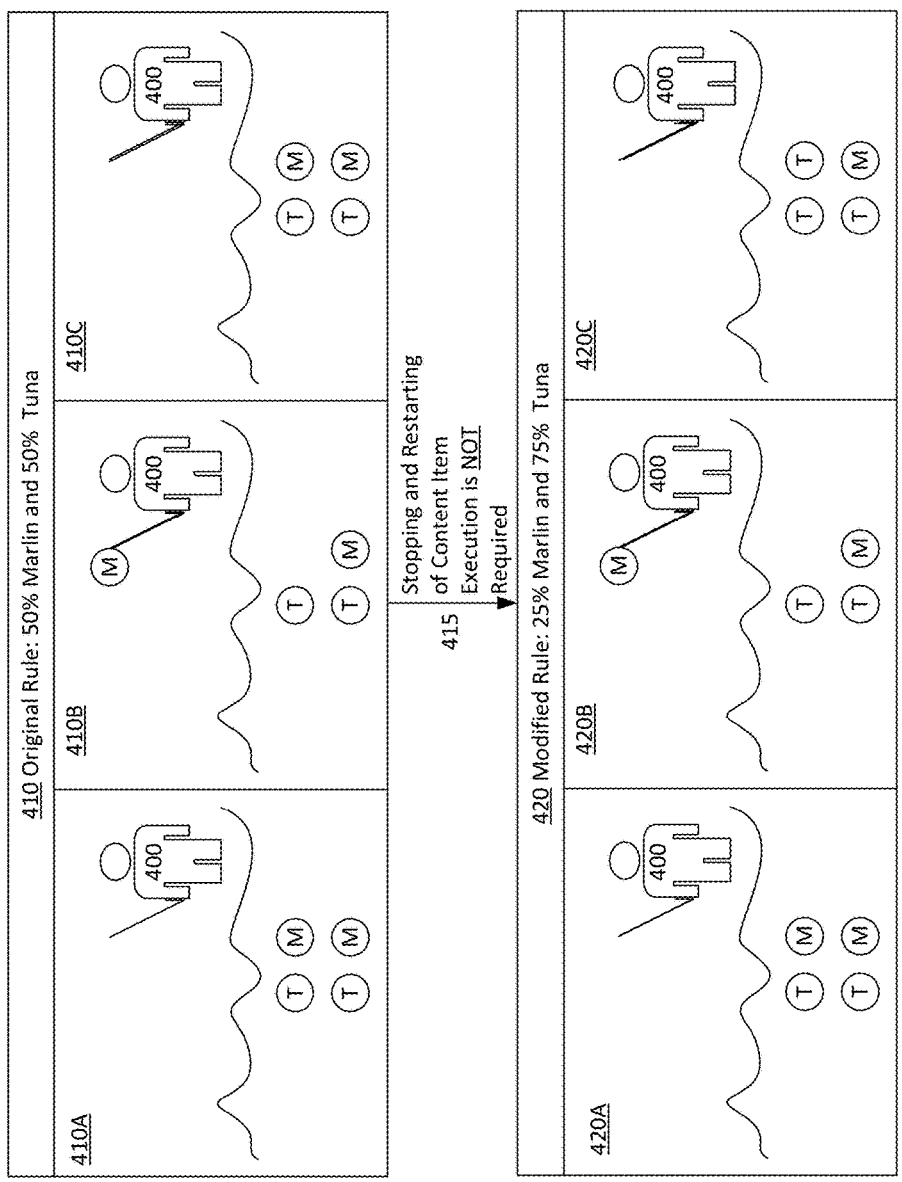
FIG. 4 is a diagram illustrating an example rule adjustment and application process that may be used in accordance with the present disclosure.

Thus, as set forth above, terrain rules, object rules, and possibly other rules may be applied during execution of a content item, such as by servers, clients and possibly other components. As also set forth above, various components may sometimes repeatedly apply and re-apply one or more rules to a virtual area or any portions thereof. The repeated application of rules to a virtual area rules during content item execution may provide a number of advantages. For example, in some cases, repeated application of rules during content item execution may allow incorporation of new or adjusted rules into the content item without the need to stop and restart execution of the content item. FIG. 4 is a diagram illustrating an example rule adjustment and application process that may be used in accordance with the present disclosure. As shown in FIG. 4, an original rule 410 specifies that a particular lake within the virtual area is to maintain a fish population distribution of fifty percent marlin and fifty percent tuna. In FIG. 4, marlins are depicted as circles labeled with the letter M, while tuna are depicted as circles labeled with the letter T.

FIG. 4 shows three representations 410A-C of a fisherman 400 catching fish in the lake at various points in time during which original rule 410 is in effect. In particular, representation 410A corresponds to an earliest point in time before the fisherman 400 has caught any fish. As shown in representation 410A, the lake includes two marlins and two tunas, which is in agreement with the fifty percent marlin and fifty percent tuna distribution specified in original rule 410. At a subsequent point in time corresponding to representation 410B, the fisherman 400 has caught a marlin (as represented by the marlin at the tip of the fishing pole connected to fisherman 400). This reduces the number of marlin in the lake such that the lake is no longer in agreement with the fifty percent marlin and fifty percent tuna distribution specified in original rule 410. Representation 410C corresponds to a subsequent time after the original rule 410 has been re-applied to the lake. As shown in representation 410C, a new marlin has been spawned in the lake in order to replace the marlin that was caught by the fisherman in representation 410B and to return the lake to being in agreement with the fifty percent marlin and fifty percent tuna distribution specified in original rule 410.

As also shown in FIG. 4, subsequent to the point in time corresponding to representation 410C, a developer modifies original rule 410 to result in modified rule 420. In particular, modified rule 420 specifies that the lake within the virtual area is to maintain a fish population distribution of twenty-five percent marlin and seventy-five percent tuna. FIG. 4 shows three representations 420A-C of fisherman 400 catching fish in the lake at various points in time during which modified rule 420 is in effect. In particular, representation 420A corresponds to a point in time immediately following the rule modification and before the modified rule has been applied. Accordingly, because the modified rule 420 has not yet been applied, the fish population continues to include two marlins and two tunas, just as it was immediately prior to the rule modification in representation 410C. At a subsequent point in time corresponding to representation 420B, the fisherman 400 has once again caught another marlin. This again reduces the number of marlin in the lake down to one marlin. It is noted, however, that, at representation 420B, the modified rule 420 has still not yet been applied. Representation 420C corresponds to a subsequent time after the modified rule 420 has been applied to the lake. As shown in representation 420C, a new tuna has been spawned in the lake in order to replace the marlin that was caught by the fisherman in representation 420B. The spawning of the new tuna in representation 420C causes the tuna population to increase to three, while the marlin population remains at one. This three to one ratio of tuna to marlin causes the lake to be in agreement with the twenty-five percent marlin and seventy-five percent tuna distribution specified in modified rule 420.

Thus, the illustrations shown in FIG. 4 provide some examples of how a rule can be applied and re-applied to automatically correct for dynamic changes in environment, such as those caused by player input and other events. Additionally, the illustrations shown in FIG. 4 provide some examples of how a rule can be modified and applied to automatically correct for changes associated with the modified rule and also for dynamic changes in environment. Moreover, it is noted that the repeated application of rules, and the ability to automatically correct and/or adjust for rule modifications, may allow rules to be modified, even during content item execution, without the need to stop and re-start execution of the content item. In particular, as shown by arrow 415 in FIG. 4, the transition between original rule 410 and modified rule 420 does not require stopping and restarting execution of the content item. As set forth above, some conventional content items may require that certain objects be manually inserted by developers at specific points in a virtual area, and this manual insertion may require an executing content item to be stopped and restarted. By contrast, the rule-based techniques described herein do not require developers to manually insert objects at particular positions and, for these and other reasons, are able to achieve the above described advantages without stopping and restarting an executing content item.

Thus, as set forth above, developers may provide and adjust rules associated with a virtual area before, during, and after execution of a content item. In some examples, a developer user interface be provided that may, for example, allow information associated with the rules to be presented and updated during execution of the content item and that may allow the rules to be adjusted during execution of the content item. In some cases, such as shown in FIG. 1, the developer user interface may be presented on a compute node operated by the developer and may allow information to be input and provided to the content provider and/or one or more servers. In some examples, the developer user interface may allow the developer to navigate throughout the virtual area at any desired global and/or local levels. The developer user interface may also allow the developer to view terrain, objects, players, weather systems and possibly other entities throughout any desired points and/or ranges of time. The developer user interface may also allow viewing and adjustment of areas in executing content items as well as content items that have not yet begun or that have completed execution.

FIG. 5 is a diagram illustrating an example developer user interface 500 that may be used in accordance with the present disclosure. As shown, developer user interface 500 includes a virtual area viewer 505 that allows for viewing of virtual area 510 or any portions thereof. Navigation control 506 may allow the developer to navigate throughout virtual area 510, such as in north, south, east, and west directions, or any combinations thereof. Zoom-in control 507 and zoom-out control 508 may allow the developer to zoom-in and zoom-out on various portions of virtual area 510. As set forth above, virtual area viewer 505 may allow viewing of terrain, objects, players, weather systems and possibly other entities in executing content items as well as content items that have not yet begun or that have completed execution.

Developer user interface 500 also includes an example control panel 520, which include example time controls 521, example terrain controls 522, example object selectors 523, and example object controls 524. In some examples, each of controls 521, 522 and 524 may include one or more controls that allow respective values to be viewed and adjusted, such as sliders, knobs, and the like. The adjustments of controls/values in the control panel 520 may cause respective adjustments to be made to virtual area 510 in virtual area viewer 505 and also, in some cases, to be applied to the virtual area in an executing content item or yet to be executed content item. In the example of FIG. 5, example time controls 521 include a time of day control 521A for viewing and adjusting a time of day and time of year control 521B for viewing and adjusting a time of year. For example, a developer may adjust time of year control 521B from a time in winter time to a time in summer, and such an adjustment may cause the depiction of virtual area 510 in virtual area viewer 505 (and also, in some cases, in an executing or yet to be executed content item) to change from winter to summer, such as by adding leaves on trees, adding grass, changing the position of the sun, extending daylight hours, etc.

In the example of FIG. 5, terrain controls 522 include mountain height control 522A, berm sharpness control 522B, and valley intensity control 522C. A developer may adjust mountain height control 522A, for example, to, globally or at any local level, cause mountains peaks to be raised to greater heights or lowered to lesser heights. A developer may adjust berm sharpness control 522B, for example, to, globally or at any local level, cause berms to rise more or less sharply. A developer may adjust valley intensity control 522C, for example, to, globally or at any local level, cause valleys to fall to greater depths or rise to lesser depths. As set forth above, these adjustments may cause respective changes to the depiction of virtual area 510 in virtual area viewer 505 and also, in some cases, to a virtual area in an executing or yet to be executed content item.

Example object selectors 523 allow various objects to be selected, such as for insertion, viewing, and adjustment. In the example of FIG. 5, object selectors 523 include a tree selector 523A and a rocks selector 523B. As should be appreciated, many other different objects may also be included in a virtual area and selected using a developer user interface. Selection of one of the object selectors 523 may allow properties for the selected object type to be controlled, for example via object controls 524. Object controls 524 include density control 524A, distance control 524B, and clumping control 524C. As an example, a developer may select tree selector 523A and then adjust density control 524A to modify tree density, adjust distance control 524B to modify distances between trees, and adjust clumping control 524C to modify tree clumping. These adjustments may also be applied globally or at any local level and may cause respective changes to the depiction of virtual area 510 in virtual area viewer 505 and also, in some cases, to a virtual area in an executing or yet to be executed content item.

Figure 6:
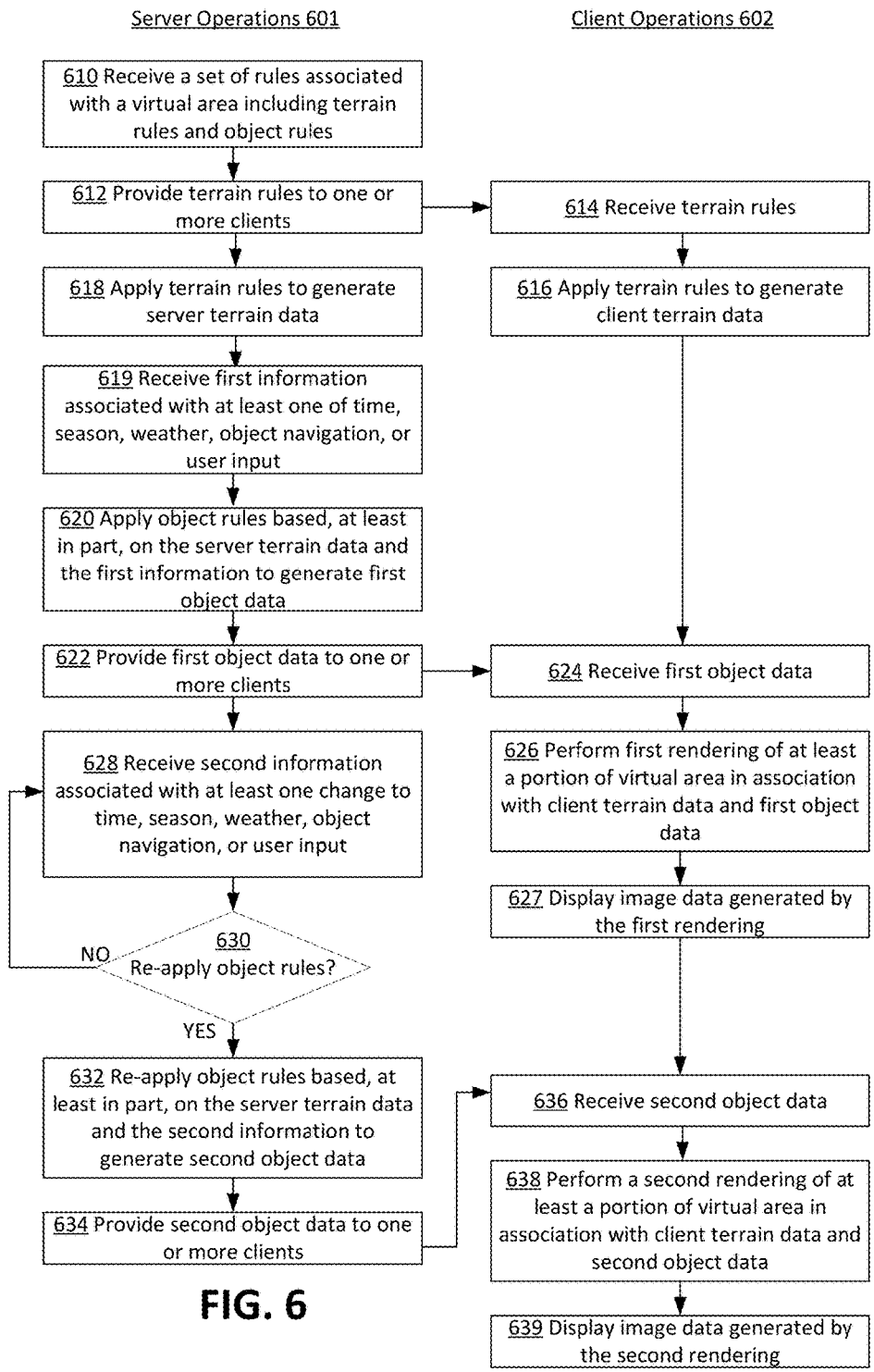
FIG. 6 is a flowchart illustrating an example process for generating and manipulating a virtual area that may be used in accordance with the present disclosure.

FIG. 6 is a flowchart illustrating an example process for generating and manipulating a virtual area that may be used in accordance with the present disclosure. As shown, operations on the left side of FIG. 6 are server operations 601 performed by one or more servers, while operations on the right side of FIG. 6 are client operations 602 performed by one or more clients. At operation 610, a set of rules associated with the virtual area is received, including terrain rules and object rules. In some examples, the set of rules may be received from a developer using a developer user interface, such as example developer user interface 500 of FIG. 5. As set forth above, the terrain rules may include rules for generating, distributing, and/or manipulating different types of terrain, such as such as flat and/or buildable space, mountains, valleys, berms (e.g., cliffs), rivers, lakes, oceans, deserts, forests, and many others. The terrain rules may indicate, for example, an amount or distribution of one or more terrain types, a terrain appearance, a berm sharpness, a mountain height, a valley intensity, terrain characteristics associated with one or more times, seasons, or weather conditions, and terrain characteristics in relation to one or more boundaries or positions. The object rules may include rules for generating, distributing, and/or manipulating different types of objects, such as trees, bushes, rocks, snow, grass, fish, birds, animals, people, vehicles, buildings, and many others. The object rules may indicate, for example, a density or distance between one or more objects, an object appearance, an object behavior, an amount or distribution of one or more object types, object characteristics associated with one or more times, seasons, or weather conditions, object characteristics in relation to one or more types of terrain, object characteristics in relation to one or more other objects, or object characteristics in relation to one or more boundaries or positions.

At operation 612, the one or more servers provide the terrain rules to the one or more clients, such as by transmitting the terrain rules over a communications network. At operation 614, the one more clients receive the terrain rules, and, at operation 616, the one or more clients apply the terrain rules to generate client terrain data. Additionally, referring back to server operations 601, it is seen that, at operation 618, the one or more servers apply the terrain rules to generate server terrain data. The terrain rules may be applied by, for example, applying parameters specified in the terrain rules based, at least in part, on features of the virtual area, such as size, shape, and other features. For example, in some cases, applying of the terrain rules may include assigning different types of terrain to various portions of the virtual area. This may include, for example, assigning mountains to certain locations within the virtual area, assigning valleys to other locations within the virtual area, assigning flat space and/or berms to yet other locations, and so forth. Thus, applying of the terrain rules may include determining coordinate values, boundaries, and or other positional information for various types of terrain. Applying of the terrain rules may also include determining attributes of certain portions of terrain relative to other portions of terrain. For example, when a berm sharpness is increased, this may cause the size and/or height of other areas of terrain, such as mountains, valleys, and/or flat space, to be increased and/or decreased. In some examples, the terrain rules may also be applied based on, for example, time, season, and weather information. Thus, in some examples, applying the terrain rules may include adding pockets of snow, puddles of water, and/or other features to certain terrain in relation to snow, rain, or other weather systems. As set forth above, in some examples, terrain data may include an indication of which types of terrain (e.g., flat space, mountain, valleys, berms, rivers, lakes, oceans, etc.) occupy which areas of space, the characteristics of certain types or portions of terrain (e.g., height, sharpness, intensity, color, texture, weather-related characteristics, seasonal characteristics, time of day characteristics), and other information associated with terrain of a virtual area.

At operation 619, the one or more serves may receive first information associated with at least one of time, season, weather, object navigation, or user input. For example, as set forth above, time system 123 of FIG. 1 may maintain and provide time, season, and weather information associated with the virtual area. Additionally, navigation system 124 of FIG. 1 may maintain and provide object navigation information, such as information about objects moving throughout the virtual area. Moreover, in some examples, the virtual area may be divided into multiple sub-areas with associated components that may exchange information about objects that move into neighboring or other sub-areas. Furthermore, in some examples, connected clients may provide information about user inputs from players or other users, such as chopping down a tree, catching a fish, or movements of players from one area to another.

At operation 620, the one or more servers apply the object rules based, at least in part, on the server terrain data and the first information to generate first object data. As set forth above, object data may include an indication of which objects occupy which positions (e.g., using coordinate or other location values), the speed and direction of movement of objects, other object characteristics (e.g., color, texture, size, shape, rotation). In some examples, object data may include indications of seasonal characteristics, weather-related characteristics, time of day characteristics, and other characteristics for various objects. Object data may also include information about when objects are added, removed, change location, or are otherwise modified.

At operation 622, the one or more serves provide the first object data to the one or more clients, such as by transmitting the first object data over a communications network. At operation 624, the one more clients receive the first object data, and, at operation 626, the one or more clients perform a first rendering of at least a portion of the virtual area in association with the client terrain data and first object data. The first rendering may generate image data associated with at least a portion of the virtual area. In some examples, the first rendering may be performed by providing the first object data and the client terrain data to one or more graphics processing units (GPU's) at the one or more clients. At operation 627, the one or more clients display image data generated by the first rendering.

Referring back to server operations 601, it is seen that, at operation 628, the one or more serves receive second information associated with at least one change to at least one of time, season, weather, object navigation, or user input. For example, operation 628 may include receiving a change (e.g., update) to any of the types of first information described above with respect to operation 619, such as changes to time of day, seasons, navigation of objects form one position to another, user input resulting in movement of players or other player actions, and the like.

At operation 630, it is determined whether object rules are being re-applied. Object rules may be reapplied at any desired time intervals or in response to various events (e.g., receiving client inputs, navigation data, etc.). If the object rules are not yet being re-applied, then the process loops back to operation 628 until the object rules are re-applied. At operation 632, the object rules are re-applied based, at least in part, on the server terrain data and the second information to generate second object data. As set forth above, when object rules are re-applied, object data may be adjusted to account for rule adjustments and changes in time, season, weather, object navigation, or user input occurring since a prior application of the object rules. For example, as shown in FIG. 4, if a character catches a fish, the fish may sometimes be replaced with another of the same or a different type of fish. Many other examples changes in object data are described in detail above and are not repeated here.

At operation 634, the one or more serves provide the second object data to the one or more clients, such as by transmitting the second object data over a communications network. At operation 636, the one more clients receive the second object data, and, at operation 638, the one or more clients perform a second rendering of at least a portion of the virtual area in association with the client terrain data and second object data. The second rendering may generate image data associated with at least a portion of the virtual area. In some examples, the second rendering may be performed by providing the second object data and the client terrain data to one or more graphics processing units (GPU's) at the one or more clients. At operation 639, the one or more clients display image data generated by the second rendering.

As described above, in some examples, such as the example depicted in FIG. 2, a virtual area may be divided into sub-areas with associated components that perform various operations associated with their respective sub-areas, such as applying one or more of the plurality of rules within their associated sub-area to generate terrain and/or object data and reporting information associated with application of the one or more of the plurality of rules within their associated sub-area. Accordingly, it is noted that various operations depicted in FIG. 6, such as operations 618, 620, and 632, may be performed by various components, such as one or more actors, associated with one or more sub-areas of the virtual area.

It is noted that FIG. 6 merely provides one example process for generating and manipulating a virtual area and that many additional or alternative processes may be employed in accordance with the techniques described herein. For example, in some cases, terrain rules may not be provided from servers to clients. Instead, terrain data generated by the servers may be provided from the servers to the clients. This approach is described in detail above with respect to communications 300A of FIG. 3. Additionally, in some examples, one or more portions of the virtual are may be rendered at the servers, such as based on terrain data and/or object data, and rendered image data may then be transmitted from the servers to the clients. In yet other examples, a content item may be executed entirely on a client or other device, without transmitting terrain rules, terrain data, and/or object data over a network. Any of the above described or other variations may be employed in accordance with the techniques described herein.

Figure 7:
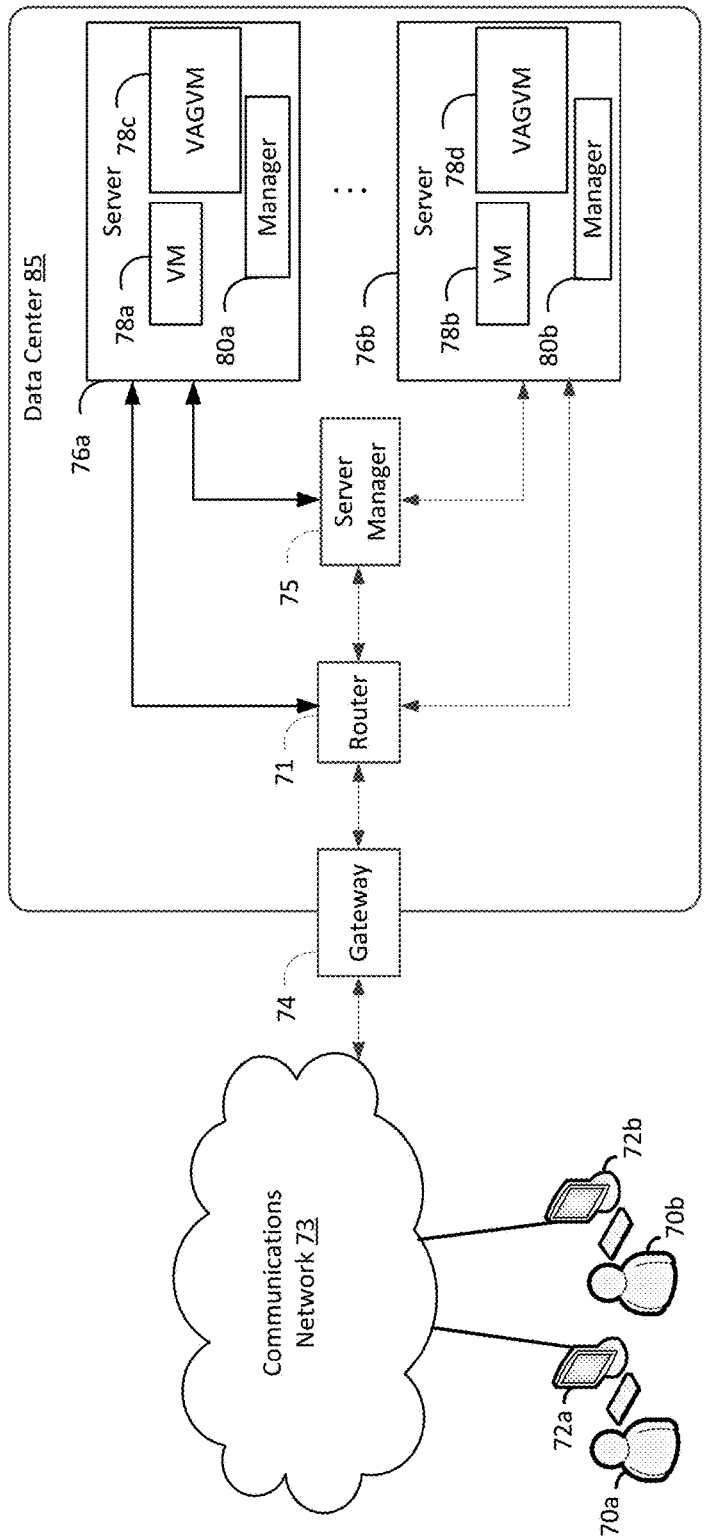
FIG. 7 is a diagram illustrating an example system for providing electronically presented content that may be used in accordance with the present disclosure.

An example system for providing electronically presented content will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are virtual area generation virtual machine ("VAGVM") instances. The VAGVM virtual machine instances 78c and 78d may be configured to perform all, or any portion, of the techniques for virtual area generation and manipulation and/or any other of the disclosed techniques in accordance with the present disclosure and described in detail above. As should be appreciated, while the particular example illustrated in FIG. 7 includes one VAGVM virtual machine in each server, this is merely an example. A server may include more than one VAGVM virtual machine or may not include any VAGVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be standard servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 8:
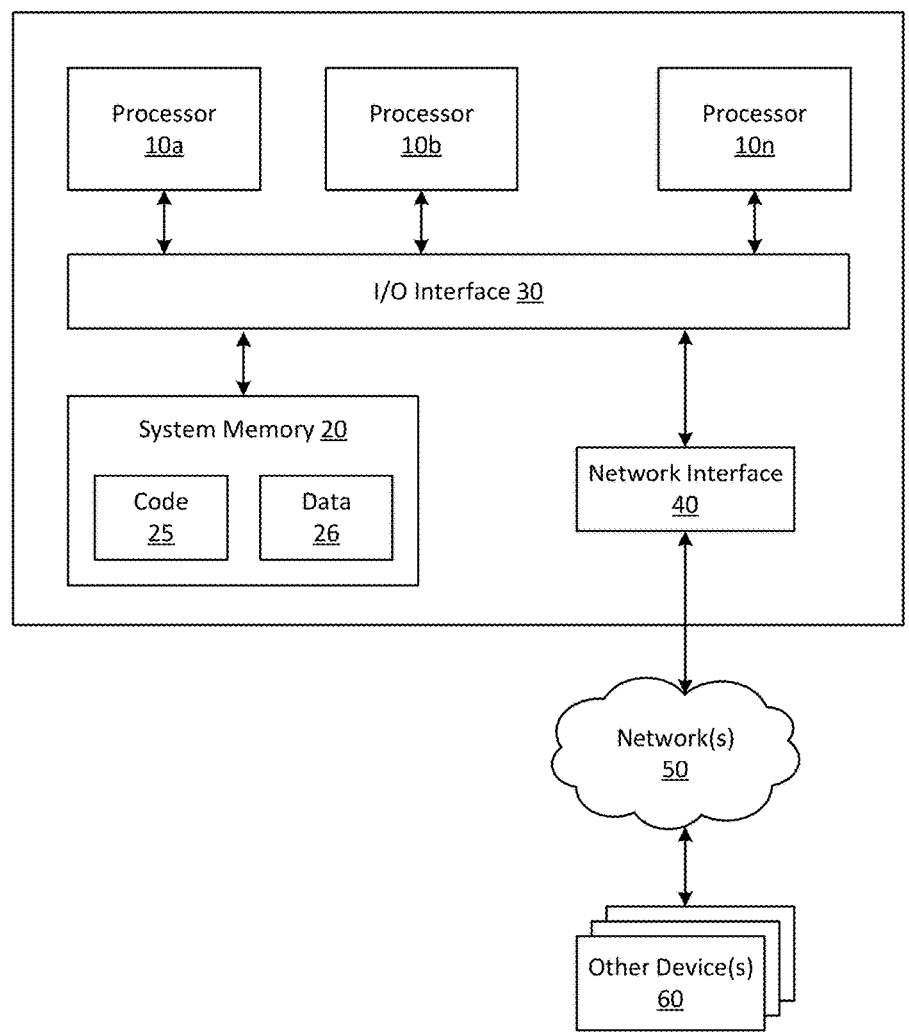
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices or special-purpose computer systems. The term "computing device," as used herein, refers to at least all these types of devices and is not limited to these types of devices.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for generating a virtual area for an electronically presented content item comprising:
   one or more processors;
   one or more memories having stored therein computer instructions that, upon execution by the one or more processors, cause at least the computing system to perform operations comprising:
      receiving a plurality of rules associated with the virtual area, the plurality of rules comprising one or more terrain rules and one or more object rules;
      applying the one or more terrain rules to generate terrain data associated with the virtual area;
      receiving first information associated with at least one of time, season, weather, object navigation, or user input;
      applying the one or more object rules to generate first object data associated with the virtual area, wherein the one or more object rules are applied based, at least in part, on the terrain data and the first information;
      providing the first object data for performing a first rendering of at least part of the virtual area in association with the first object data;
      receiving second information associated with at least one change to at least one of time, season, weather, object navigation, or user input;
      re-applying the one or more object rules to generate second object data associated with the virtual area, wherein the one or more object rules are re-applied based, at least in part, on the terrain data and the second information, wherein at least one of the plurality of rules relates to a distribution that is adjustable during execution of the electronically presented content item and applicable, after adjustment, by spawning one or more new objects in agreement with the adjustment without stopping and restarting the execution; and
      providing the second object data for performing a second rendering of at least part of the virtual area in association with the second object data.

2. The computing system of claim 1, wherein the virtual area is divided into a plurality of sub-areas, and wherein each sub-area has one or more associated components that apply one or more of the plurality of rules within their associated sub-area and that report information associated with application of the one or more of the plurality of rules within their associated sub-area.

3. A method for generating a virtual area for an electronically presented content item comprising:
   receiving a plurality of rules associated with the virtual area, the plurality of rules comprising one or more terrain rules and one or more object rules;
   applying the one or more terrain rules to generate terrain data associated with the virtual area;
   receiving first information associated with at least one of time, season, weather, object navigation, or user input;
   applying the one or more object rules to generate first object data associated with the virtual area, wherein the one or more object rules are applied based, at least in part, on the terrain data and the first information;

providing the first object data for performing a first rendering of at least part of the virtual area in association with the first object data;

receiving second information associated with at least one change to at least one of time, season, weather, object navigation, or user input;

re-applying the one or more object rules to generate second object data associated with the virtual area, wherein the one or more object rules are re-applied based, at least in part, on the terrain data and the second information, wherein at least one of the plurality of rules relates to a distribution that is adjustable during execution of the electronically presented content item and applicable, after adjustment, by spawning one or more new objects in agreement with the adjustment without stopping and restarting the execution; and providing the second object data for performing a second rendering of at least part of the virtual area in association with the second object data.

4. The method of claim 3, wherein the virtual area is divided into a plurality of sub-areas, and wherein each sub-area has one or more associated components that apply one or more of the plurality of rules within their associated sub-area and that report information associated with application of the one or more of the plurality of rules within their associated sub-area.

5. The method of claim 3, further comprising providing a user interface that allows information associated with the plurality of rules to be presented and updated during execution of the electronically presented content item and that allows the plurality of rules to be adjusted during execution of the electronically presented content item.

6. The method of claim 3, wherein at least one object rule indicates at least one of an a density or distance between one or more objects, an object appearance, an object behavior, an amount or distribution of one or more object types, object characteristics associated with one or more times, seasons, or weather conditions, object characteristics in relation to one or more types of terrain, object characteristics in relation to one or more other objects, or object characteristics in relation to one or more boundaries or positions.

7. The method of claim 3, wherein at least one terrain rule indicates at least one of an amount or distribution of one or more terrain types, a terrain appearance, a berm sharpness, a mountain height, a valley intensity, terrain characteristics associated with one or more times, seasons, or weather conditions, terrain characteristics in relation to one or more boundaries or positions.

8. The method of claim 3, further comprising maintaining at least one of a time of day or a time of year in association with the virtual area, and wherein at least one of the plurality of rules is applied based, at least in part, on at least one of the time of day or the time of year.

9. One or more non-transitory computer-readable storage media having stored thereon instructions that, upon execution by one or more compute nodes, cause the one or more compute nodes to perform operations comprising:

receiving a plurality of rules associated with a virtual area for an electronically presented content item, the plurality of rules comprising one or more terrain rules and one or more object rules;

applying the one or more terrain rules to generate terrain data associated with the virtual area;

receiving first information associated with at least one of time, season, weather, object navigation, or user input;

applying the one or more object rules to generate first object data associated with the virtual area, wherein the one or more object rules are applied based, at least in part, on the terrain data and the first information;

providing the first object data for performing a first rendering of at least part of the virtual area in association with the first object data;

receiving second information associated with at least one change to at least one of time, season, weather, object navigation, or user input;

re-applying the one or more object rules to generate second object data associated with the virtual area, wherein the one or more object rules are re-applied based, at least in part, on the terrain data and the second information, wherein at least one of the plurality of rules relates to a distribution that is adjustable during execution of the electronically presented content item and applicable, after adjustment, by spawning one or more new objects in agreement with the adjustment without stopping and restarting the execution; and providing the second object data for performing a second rendering of at least part of the virtual area in association with the second object data.

10. The one or more non-transitory computer-readable storage media of claim 9, wherein the virtual area is divided into a plurality of sub-areas, and wherein each sub-area has one or more associated components that apply one or more of the plurality of rules within their associated sub-area and that report information associated with application of the one or more of the plurality of rules within their associated sub-area.

11. The one or more non-transitory computer-readable storage media of claim 9, wherein the operations further comprise providing a user interface that allows information associated with the plurality of rules to be presented and updated during execution of the electronically presented content item and that allows the plurality of rules to be adjusted during execution of the electronically presented content item.

12. The one or more non-transitory computer-readable storage media of claim 9, wherein at least one object rule indicates at least one of an a density or distance between one or more objects, an object appearance, an object behavior, an amount or distribution of one or more object types, object characteristics associated with one or more times, seasons, or weather conditions, object characteristics in relation to one or more types of terrain, object characteristics in relation to one or more other objects, or object characteristics in relation to one or more boundaries or positions.

13. The one or more non-transitory computer-readable storage media of claim 9, wherein at least one terrain rule indicates at least one of an amount or distribution of one or more terrain types, a terrain appearance, a berm sharpness, a mountain height, a valley intensity, terrain characteristics associated with one or more times, seasons, or weather conditions, terrain characteristics in relation to one or more boundaries or positions.

14. The one or more non-transitory computer-readable storage media of claim 9, wherein the operations further comprise maintaining at least one of a time of day or a time of year in association with the virtual area, and wherein at least one of the plurality of rules is applied based, at least in part, on at least one of the time of day or the time of year.

* * * * *